US011431362B2

(12) United States Patent
Jang

(10) Patent No.: US 11,431,362 B2
(45) Date of Patent: Aug. 30, 2022

(54) LOW NOISE BLOCK DOWN CONVERTER FOR RECEIVING SATELLITE BROADCASTING AND ANTENNA APPARATUS INCLUDING THE SAME

(71) Applicant: Atron Co., Ltd., Changwon-si (KR)

(72) Inventor: Youn Gil Jang, Changwon-si (KR)

(73) Assignee: ATRON CO., LTD., Changwon-si (KR)

( * ) Notice: Subject to any disclaimer, the term of this patent is extended or adjusted under 35 U.S.C. 154(b) by 0 days.

(21) Appl. No.: 17/084,567

(22) Filed: Oct. 29, 2020

(65) Prior Publication Data

US 2021/0135696 A1  May 6, 2021

(30) Foreign Application Priority Data

Nov. 1, 2019  (KR) .................. 10-2019-0138282

(51) Int. Cl.
*H04B 1/04*  (2006.01)

(52) U.S. Cl.
CPC ......... *H04B 1/0475* (2013.01); *H04B 1/0466* (2013.01); *H04B 2001/0416* (2013.01)

(58) Field of Classification Search
CPC ...... H04B 1/66; H04B 1/0475; H04B 1/0466; H04B 2001/0416; H04B 7/185
USPC .................. 375/262, 295, 296–297, 340
See application file for complete search history.

(56) References Cited

U.S. PATENT DOCUMENTS

| 2004/0192190 A1* | 9/2004 | Motoyama ........... H04B 1/1607 455/3.02 |
| 2007/0202920 A1* | 8/2007 | Eddy .................... H01P 7/10 455/562.1 |
| 2009/0054007 A1* | 2/2009 | Kawabe ................... H04B 1/30 455/76 |
| 2012/0075041 A1* | 3/2012 | Flynn ..................... H01P 1/207 333/211 |
| 2012/0262333 A1* | 10/2012 | Trummer ................ H05H 7/22 342/146 |

(Continued)

FOREIGN PATENT DOCUMENTS

| JP | 2014-064237 | 4/2014 |
| KR | 2011-0065783 | 6/2011 |
| KR | 2012-0019194 | 3/2012 |

OTHER PUBLICATIONS

Korean Intellectual Property Office, "Office Action" in application No. 120030326926, dated Sep. 4, 2020, 8 pages including an English translation.

*Primary Examiner* — Emmanuel Bayard
(74) *Attorney, Agent, or Firm* — Hickman Becker Bingham Ledesma LLP

(57) ABSTRACT

A low noise block down converter for receiving satellite broadcasting comprises an input terminal; a low noise amplifying unit including one or more low noise amplifiers configured to amplify a signal received from the input terminal, and a built-in cavity waveguide band pass filter configured to pass a frequency band being higher or lower than a frequency band of a predetermined terrestrial transmission signal among satellite broadcasting frequency bands of signals amplified by the one or more low noise amplifiers; and a mixer configured to convert the signal output from the low noise amplifying unit into an intermediate frequency signal by mixing the signal output from the low noise amplifying unit with a local oscillation signal.

18 Claims, 17 Drawing Sheets

(56) References Cited

U.S. PATENT DOCUMENTS

2019/0120969 A1\* 4/2019 Hamzeh ................ H04W 16/14
2019/0268046 A1\* 8/2019 Kim ...................... H01Q 3/267

\* cited by examiner

LOW NOISE BLOCK DOWN CONVERTER FOR RECEIVING SATELLITE BROADCASTING AND ANTENNA APPARATUS INCLUDING THE SAME

CROSS-REFERENCE TO RELATED APPLICATION

This application is based on and claims priority under 35 U.S.C. § 119 to Korean Patent Application No. 10-2019-0138282 filed on Nov. 1, 2019, in the Korean Intellectual Property Office, the disclosure of which is herein incorporated by reference in its entirety.

BACKGROUND

Field

The disclosure relates to a low noise block down converter for receiving satellite broadcasting and an antenna apparatus including the same, and more particularly, to a low noise block down converter for receiving satellite broadcasting and an antenna apparatus including the same, which can efficiently remove interference with a terrestrial transmission signal, such as, for example, a 5G mobile communication signal, using a built-in cavity waveguide band pass filter.

Description of Related Art

In general, for satellite broadcasting reception and satellite communication, a feed horn and a low noise block down converter (LNB) are installed in a receiving unit of an antenna apparatus having a dish-shaped reflector. A satellite signal collected by the reflector of the antenna apparatus as described above is transferred to the low noise block down converter through the feed horn, and the low noise block down converter low-noise-amplifies the satellite signal and removes an out-of-band signal from the amplified satellite signal. Thereafter, a mixer down-converts the frequency by mixing the satellite signal with a local oscillation signal of the low noise block down converter itself, and outputs the signal to a satellite communication terminal or a satellite broadcasting receiver.

On the other hand, Korea became the world's first country to start a 5G mobile communication service in the first half of 2019, and mobile communication companies worldwide, including mobile communication companies in the United States, have started or are preparing this service. However, because the 5G mobile communication frequency band (in Korea, 3.42 to 3.7 GHz) partially overlaps the C-band satellite broadcasting frequency band (in general, 3.4 to 4.2 GHz), and in particular, a 5G mobile communication signal is transmitted from a terrestrial base station, the signal strength is strong enough to interfere with reception of the C-band satellite broadcasting, and a low noise block down converter becomes in a saturated state to cause a problem that the reception of the satellite broadcasting is not possible.

To solve the above-described problem, an antenna apparatus has been used, in which an external cavity waveguide band pass filter is additionally installed at a front end of the low noise block down converter.

FIG. 1 is a perspective view of an antenna apparatus including a low noise block down converter for receiving satellite broadcasting, coupled with an external cavity waveguide band pass filter in the related art, FIG. 2 is a perspective view of an external cavity waveguide band pass filter in the related art, and FIG. 3 is a graph illustrating a reflection loss and an insertion loss of an external cavity waveguide band pass filter in the related art.

With reference to FIGS. 1 to 3, in an antenna apparatus 100 including a low noise block down converter 200 for receiving satellite broadcasting, coupled with an external cavity waveguide band pass filter 140 in the related art, the external cavity waveguide band pass filter 140 serves to pass a signal of 3.8 to 4.2 GHz and to remove a signal of 3.42 to 3.7 GHz that is a 5G mobile communication frequency band in order to make it possible to receive the satellite broadcasting.

The external cavity waveguide band pass filter 140 as described above is of a cavity type using a metal block, and has a structure in which blocks of multiple orders are provided in a waveguide and metal rods are inserted into the blocks so as to pass a necessary frequency signal and not to pass an unnecessary frequency signal. However, because the external cavity waveguide band pass filter 140 as described above is expensive and has a large volume (120 mm×100 mm×70 mm), it has a low economic efficiency, and its installation work is difficult. Further, because the weight of the external cavity waveguide band pass filter 140 is heavy (650 g), it lays a burden on a support 120 supporting the feed horn 130 being coupled to the external cavity waveguide band pass filter 140 to cause the equipment maintenance to be difficult.

Further, the external cavity waveguide band pass filter 140 has an insertion loss (about 0.5 to 1.0 dB) by itself, and such an insertion loss is amplified by a low noise amplifier (LNA) in the low noise block down converter 200 for receiving the satellite broadcasting as well as it is added to a noise of the filter in the low noise block down converter 200 for receiving the satellite broadcasting to degrade the quality of the received satellite broadcasting signal.

SUMMARY

An aspect according to various embodiments of the disclosure is to provide a low noise block down converter for receiving satellite broadcasting and an antenna apparatus, which can facilitate an installation work and equipment maintenance with high economic efficiency, improve the quality of a received satellite broadcasting signal, and remove interference with a terrestrial transmission signal, such as, for example, a 5G mobile communication signal.

Another aspect according to various embodiments of the disclosure is to provide a low noise block down converter for receiving satellite broadcasting and an antenna apparatus, which can have a sufficient gain of an intermediate frequency signal, minimize amplification of an unnecessary frequency band by a low noise amplifier, and prevent the low noise amplifier from being saturated.

In order to achieve the above aspects, according to a first feature of the disclosure, a low noise block down converter for receiving satellite broadcasting includes an input terminal; a low noise amplifying unit including one or more low noise amplifiers configured to amplify a signal received from the input terminal, and a built-in cavity waveguide band pass filter configured to pass a frequency band being higher or lower than a frequency band of a predetermined terrestrial transmission signal among satellite broadcasting frequency bands of signals amplified by the one or more low noise amplifiers; and a mixer configured to convert the signal output from the low noise amplifying unit into an intermediate frequency signal by mixing the signal output from the low noise amplifying unit with a local oscillation signal.

Preferably, according to the disclosure, the mixer is an active mixer configured to amplify one or more of the signal output from the low noise amplifying unit and the intermediate frequency signal.

Further, according to a second feature of the disclosure, an antenna apparatus includes a reflector configured to concentrate radio waves through reflection; a feed horn configured to receive the radio waves concentrated by the reflector; and a low noise block down converter for receiving the satellite broadcasting, configured to convert a signal transferred from the feed horn into an intermediate frequency signal.

By using the low noise block down converter for receiving the satellite broadcasting and the antenna apparatus according to the embodiments of the disclosure, the following effects are achieved.

1. The installation work and equipment maintenance can be facilitated with the high economic efficiency, the quality of the received satellite broadcasting signal can be improved, and the interference with the terrestrial transmission signal, such as, for example, the 5G mobile communication signal, can be removed.

2. The sufficient gain of the intermediate frequency signal can be obtained, the amplifying of the unnecessary frequency band by the low noise amplifier can be minimized, and the low noise amplifier can be prevented from being saturated.

Effects that can be obtained in the disclosure are not limited to the above-described effects, and other unmentioned effects can be clearly understood by those of ordinary skill in the art to which the disclosure pertains from the following description.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Hereinafter, preferred embodiments of a low noise block down converter for receiving satellite broadcasting and an antenna apparatus according to the disclosure will be described in detail with reference to the accompanying drawings.

Figure 4:
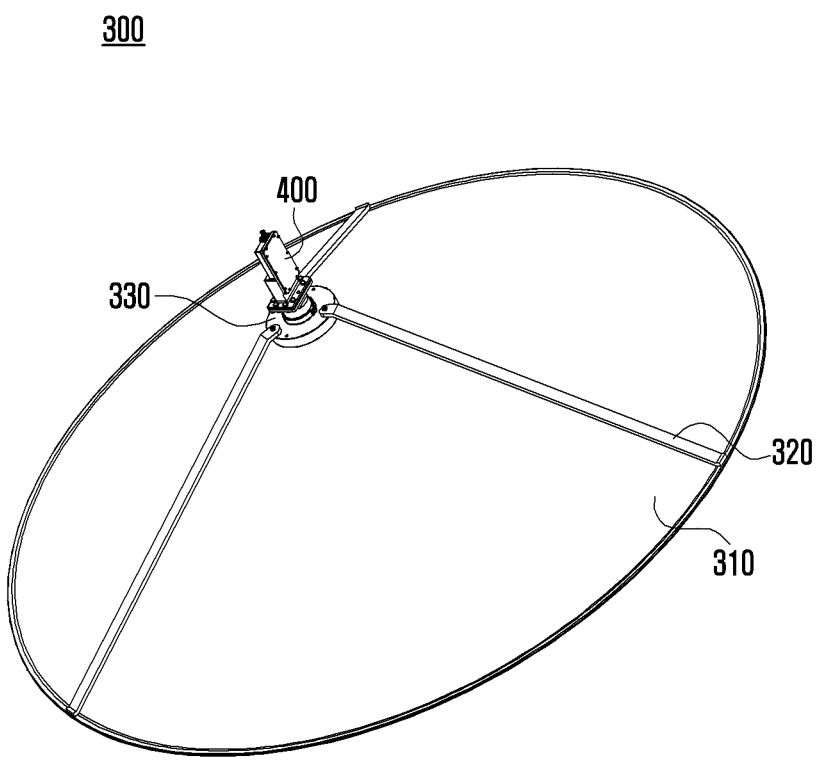
FIG. 4 is a perspective view of an antenna apparatus including a low noise block down converter for receiving satellite broadcasting according to an embodiment of the disclosure.
Figure 5:
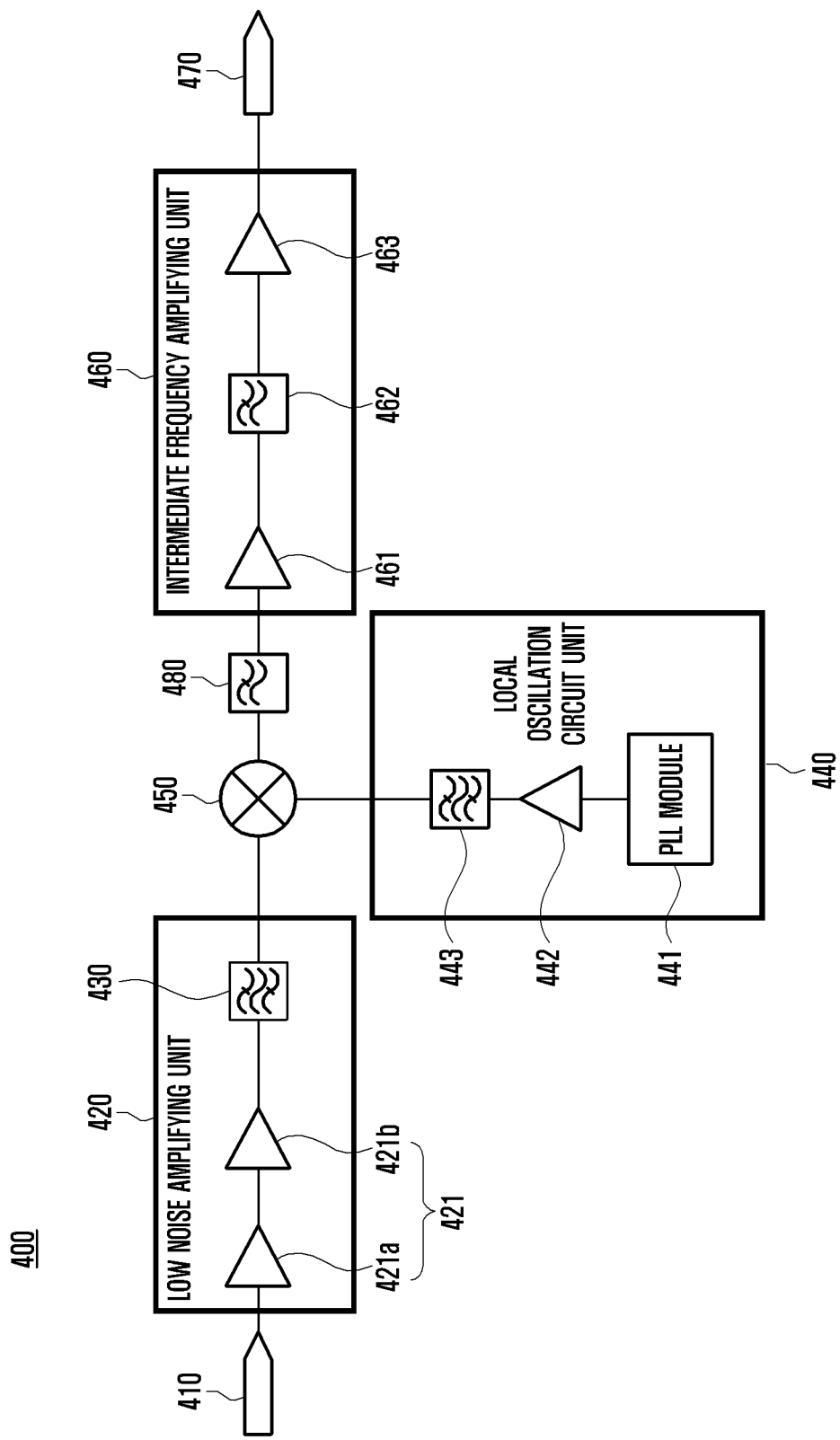
FIG. 5 is a circuit block diagram of a low noise block down converter for receiving satellite broadcasting according to an embodiment of the disclosure.
Figure 6:
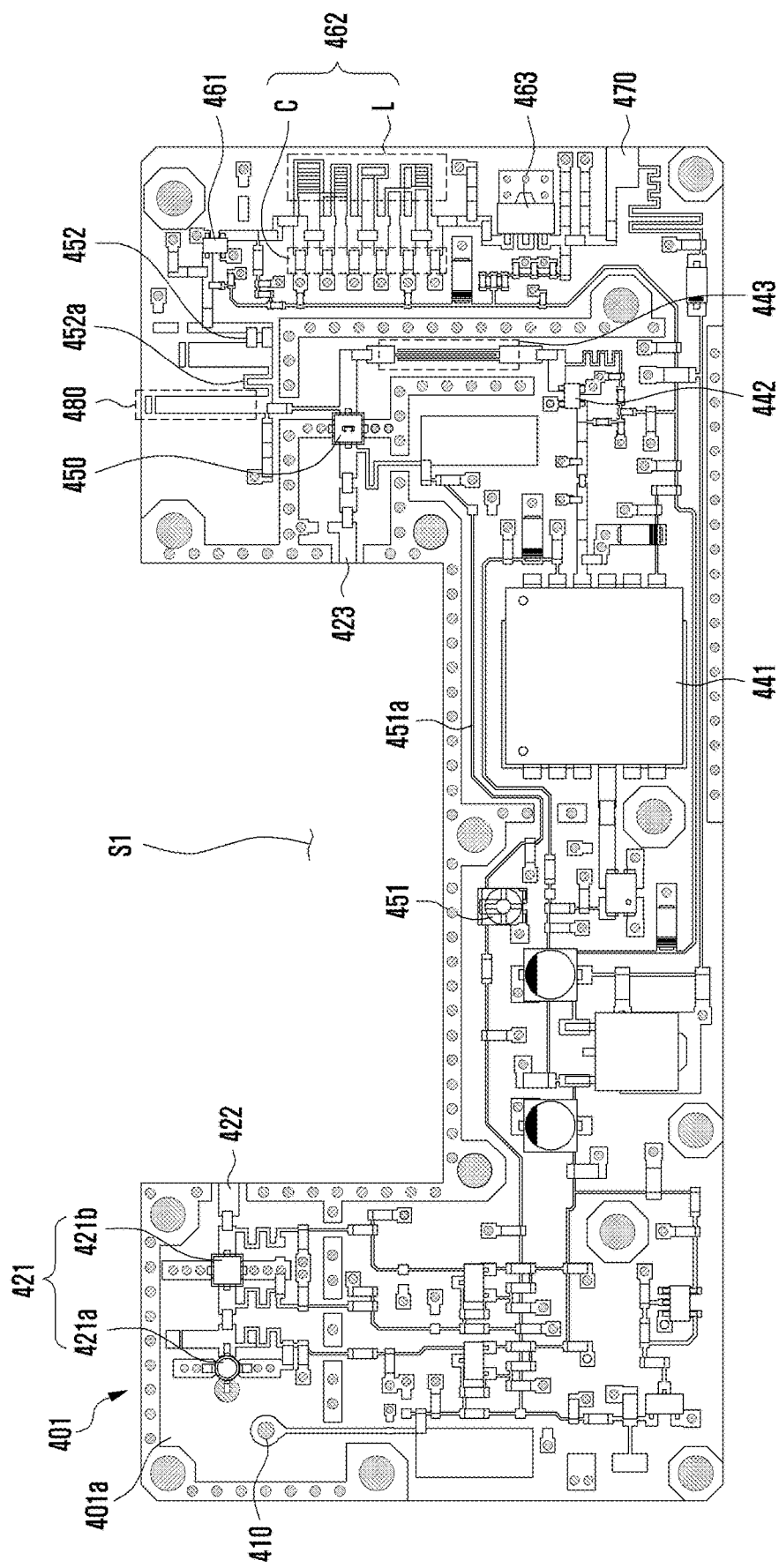
FIG. 6 is a plan view of a circuit board mounted with parts of a low noise block down converter for receiving satellite broadcasting according to an embodiment of the disclosure.

FIG. 4 is a perspective view of an antenna apparatus including a low noise block down converter for receiving satellite broadcasting according to an embodiment of the disclosure, FIG. 5 is a circuit block diagram of a low noise block down converter for receiving satellite broadcasting according to an embodiment of the disclosure, and FIG. 6 is a plan view of a circuit board mounted with parts of a low noise block down converter for receiving satellite broadcasting according to an embodiment of the disclosure.

Figure 7A:
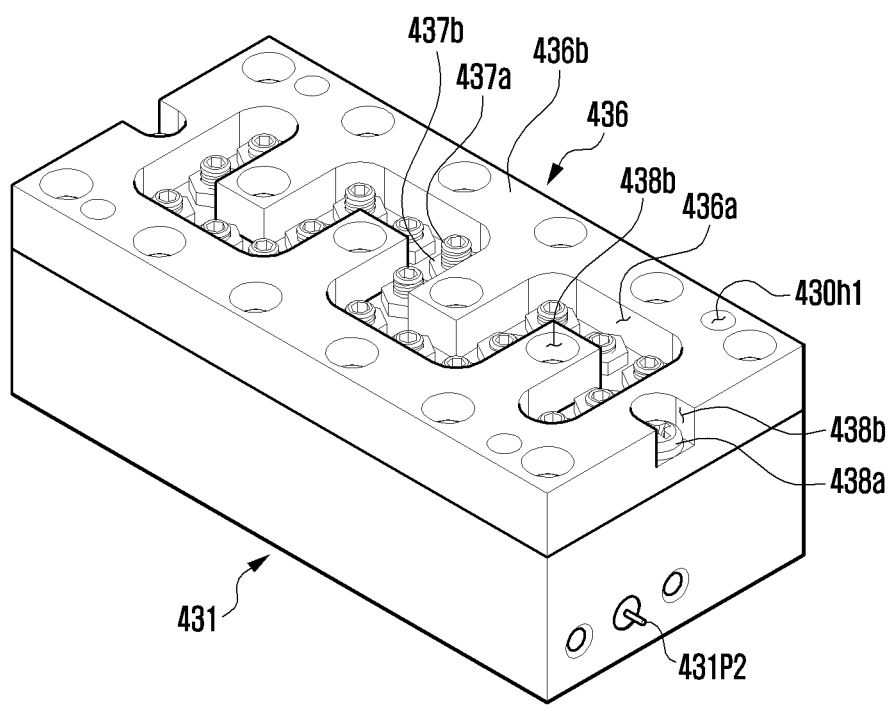
FIG. 7A is a perspective view of a built-in cavity waveguide band pass filter of a low noise block down converter for receiving satellite broadcasting according to an embodiment of the disclosure.
Figure 7B:
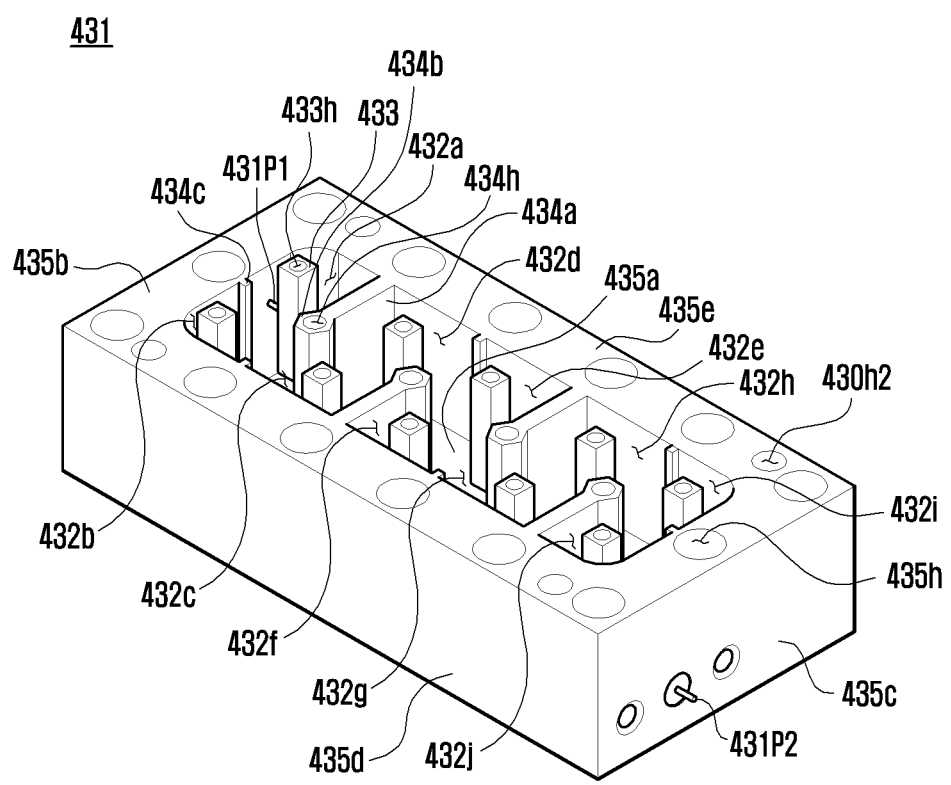
FIG. 7B is a perspective view of a body part of a built-in cavity waveguide band pass filter of a low noise block down converter for receiving satellite broadcasting according to an embodiment of the disclosure.
Figure 7C:
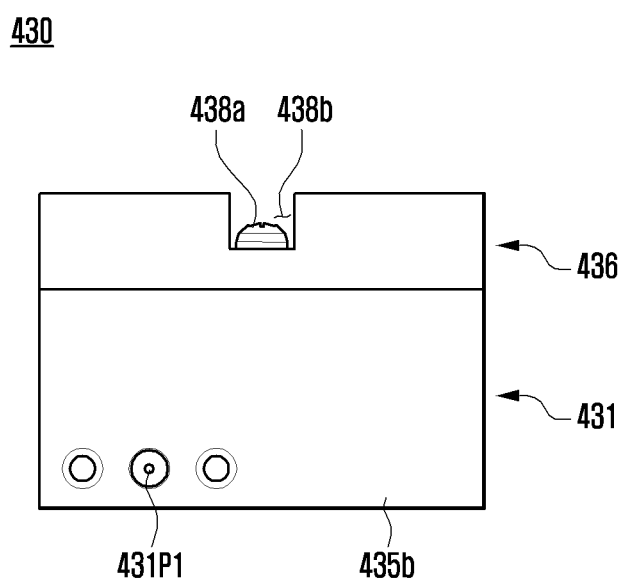
FIG. 7C is a front view of a built-in cavity waveguide band pass filter of a low noise block down converter for receiving satellite broadcasting according to an embodiment of the disclosure.
Figure 7D:
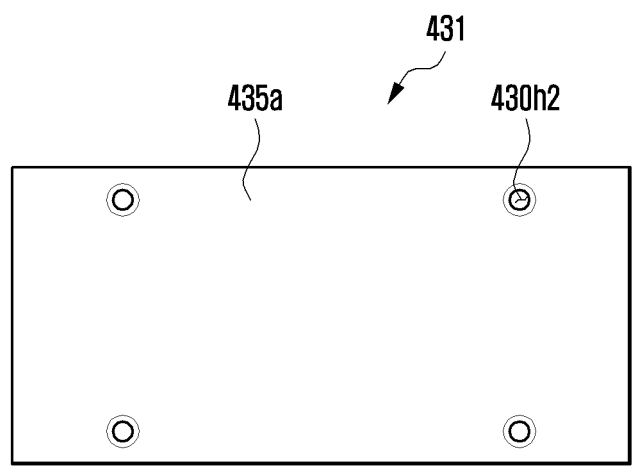
FIG. 7D is a bottom view of a body part of a built-in cavity waveguide band pass filter of a low noise block down converter for receiving satellite broadcasting according to an embodiment of the disclosure.

FIG. 7A is a perspective view of a built-in cavity waveguide band pass filter of a low noise block down converter for receiving satellite broadcasting according to an embodiment of the disclosure, FIG. 7B is a perspective view of a body part of a built-in cavity waveguide band pass filter of a low noise block down converter for receiving satellite broadcasting according to an embodiment of the disclosure, FIG. 7C is a front view of a built-in cavity waveguide band pass filter of a low noise block down converter for receiving satellite broadcasting according to an embodiment of the disclosure, and FIG. 7D is a bottom view of a body part of a built-in cavity waveguide band pass filter of a low noise block down converter for receiving satellite broadcasting according to an embodiment of the disclosure.

Figure 8:
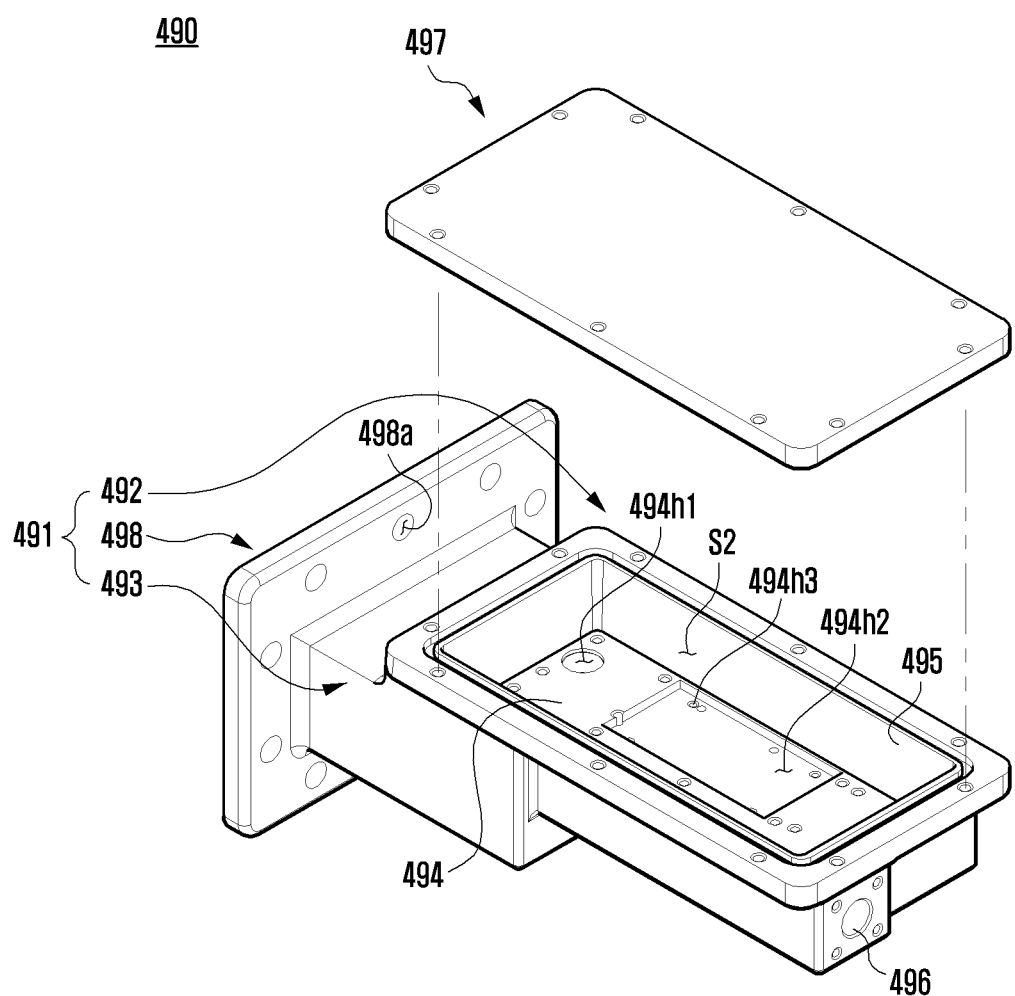
FIG. 8 is an exploded perspective view of a housing of a low noise block down converter for receiving satellite broadcasting according to an embodiment of the disclosure.

FIG. 8 is an exploded perspective view of a housing of a low noise block down converter for receiving satellite broadcasting according to an embodiment of the disclosure.

Figure 9:
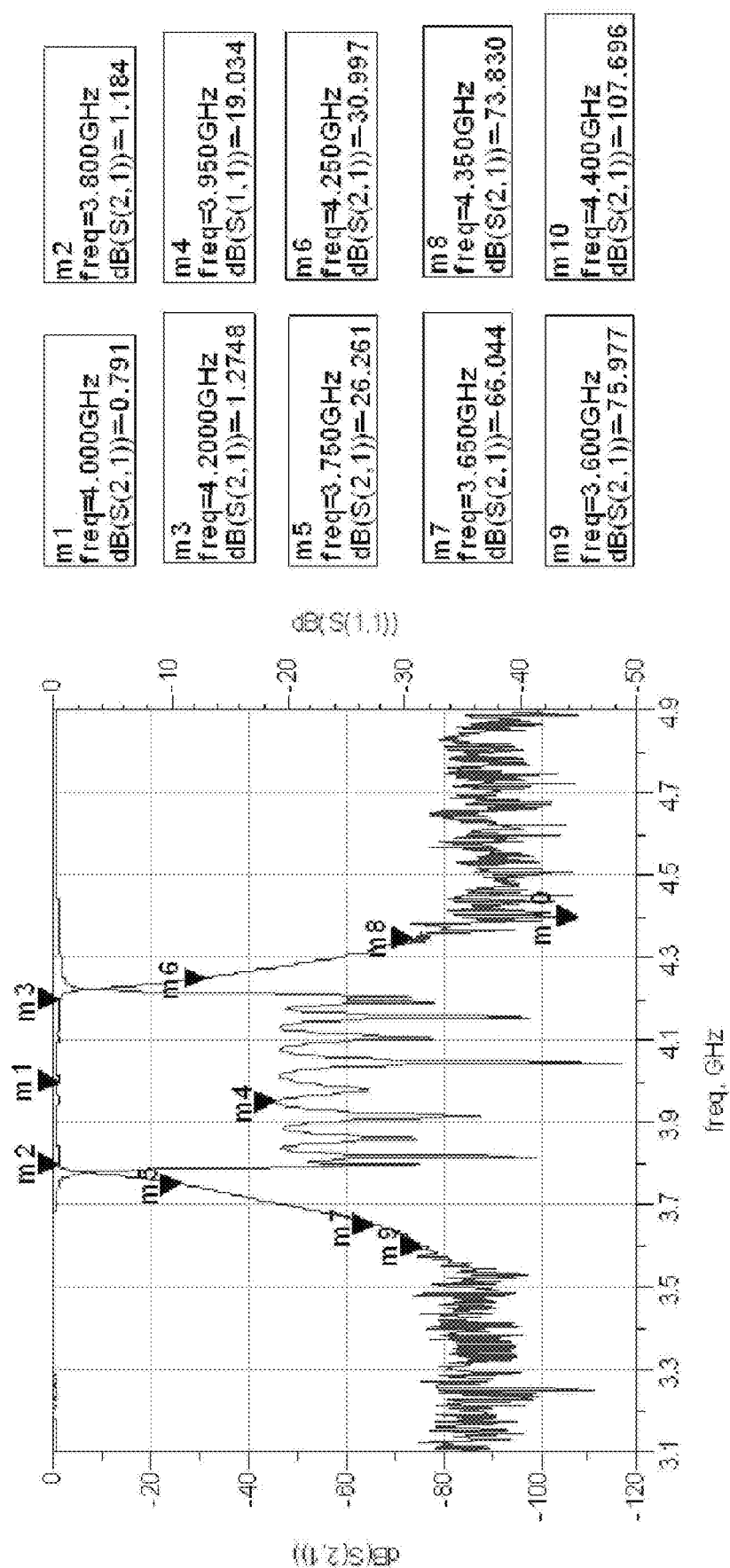
FIG. 9 is a graph illustrating a reflection loss and an insertion loss of a built-in cavity waveguide band pass filter of a low noise block down converter for receiving satellite broadcasting according to an embodiment of the disclosure.

FIG. 9 is a graph illustrating a reflection loss and an insertion loss of a built-in cavity waveguide band pass filter of a low noise block down converter for receiving satellite broadcasting according to an embodiment of the disclosure. In case of FIG. 9, the pass band of a built-in cavity waveguide band pass filter is 3.8 to 4.2 GHz.

Figure 10:
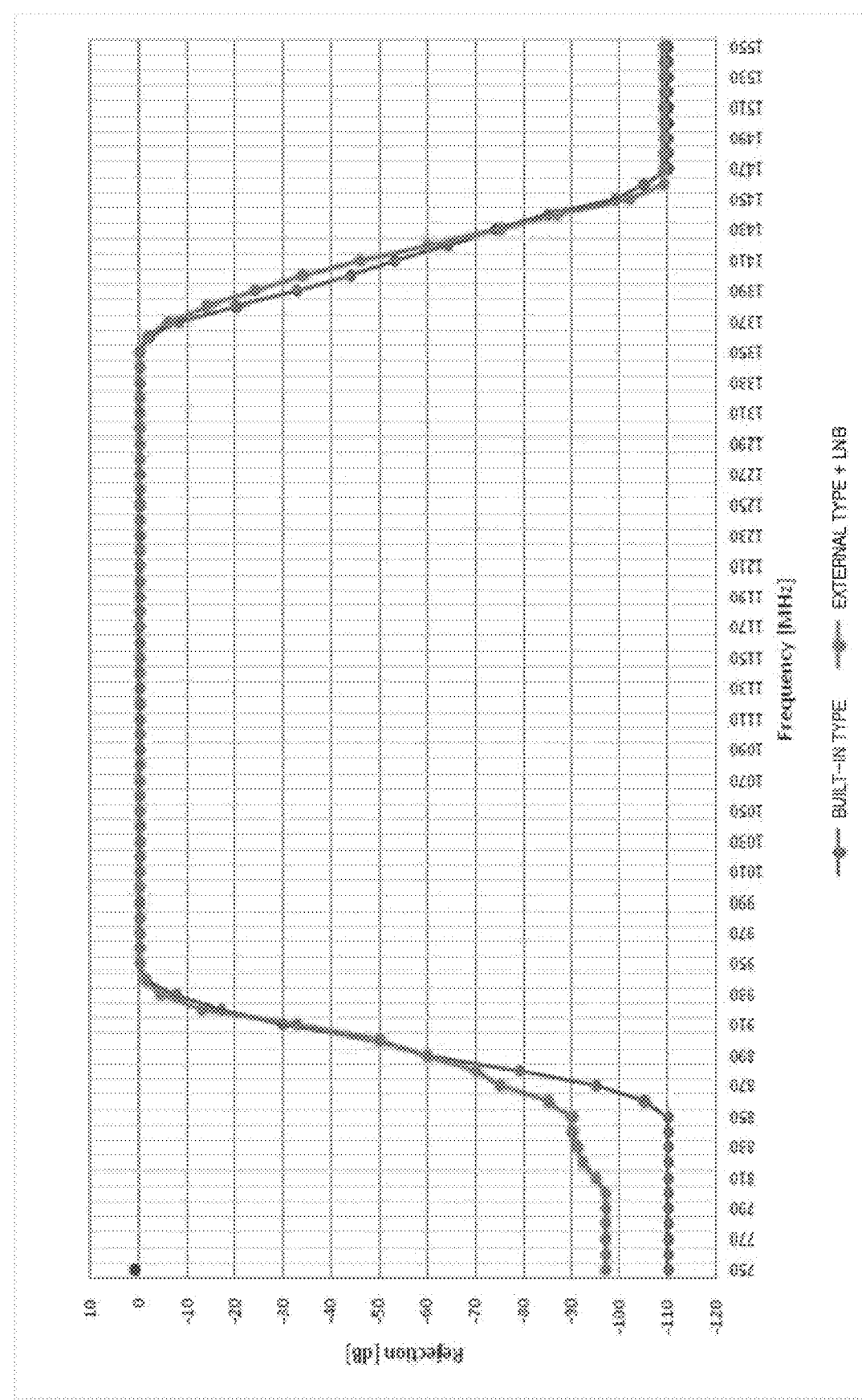
FIG. 10 is a graph illustrating comparison of removal characteristics of a low noise block down converter for receiving satellite broadcasting according to an embodiment of the disclosure with removal characteristics of a low noise block down converter for receiving satellite broadcasting, coupled with an external cavity waveguide band pass filter in the related art.

FIG. 10 is a graph illustrating comparison of removal characteristics of a low noise block down converter for receiving satellite broadcasting according to an embodiment of the disclosure with removal characteristics of a low noise block down converter for receiving satellite broadcasting, coupled with an external cavity waveguide band pass filter in the related art. In case of FIG. 10, the frequency band of a designed intermediate frequency signal of a low noise block down converter for receiving satellite broadcasting is 950 to 1350 MHz.

Figure 11:
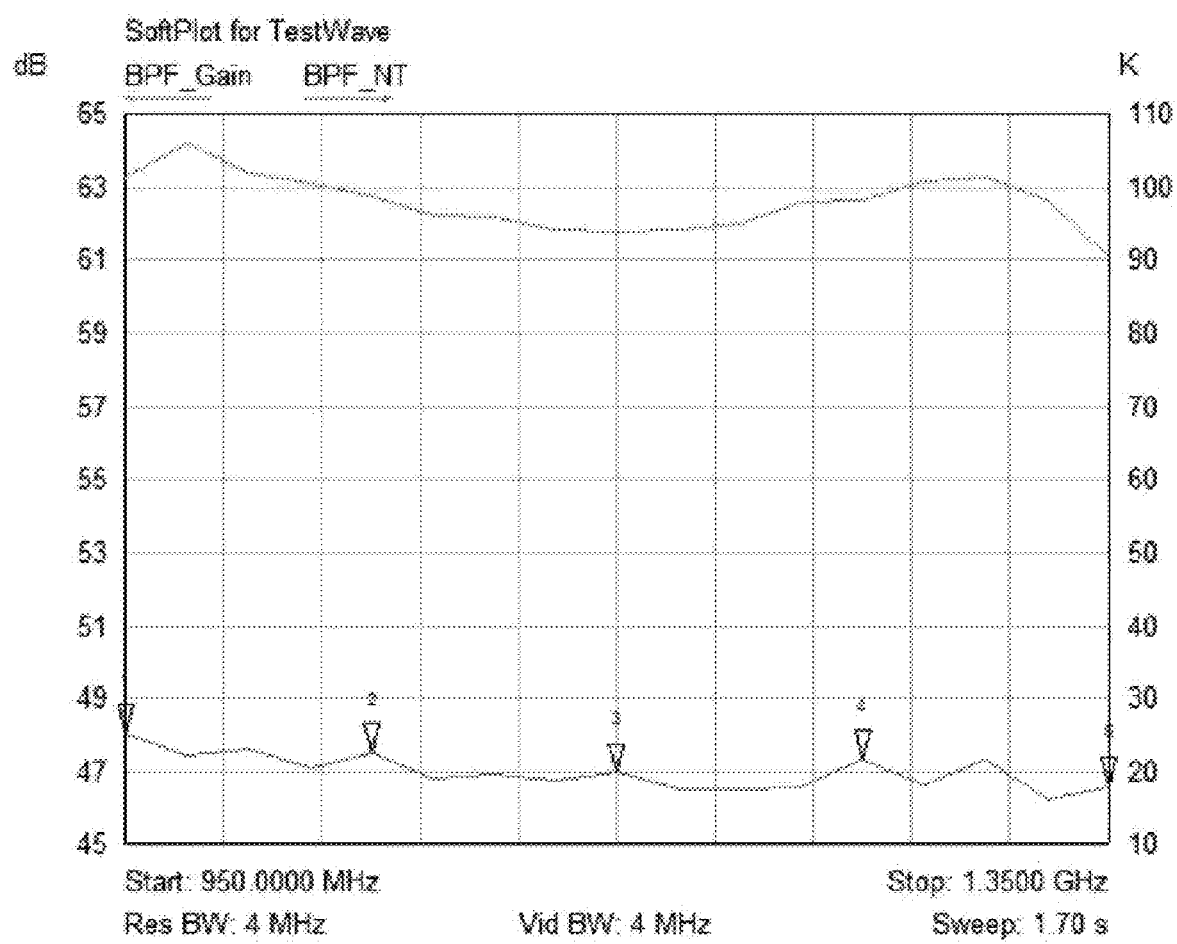
FIG. 11 is a graph illustrating a gain and a noise temperature (NT) of a low noise block down converter for receiving satellite broadcasting according to an embodiment of the disclosure.
Figure 12:
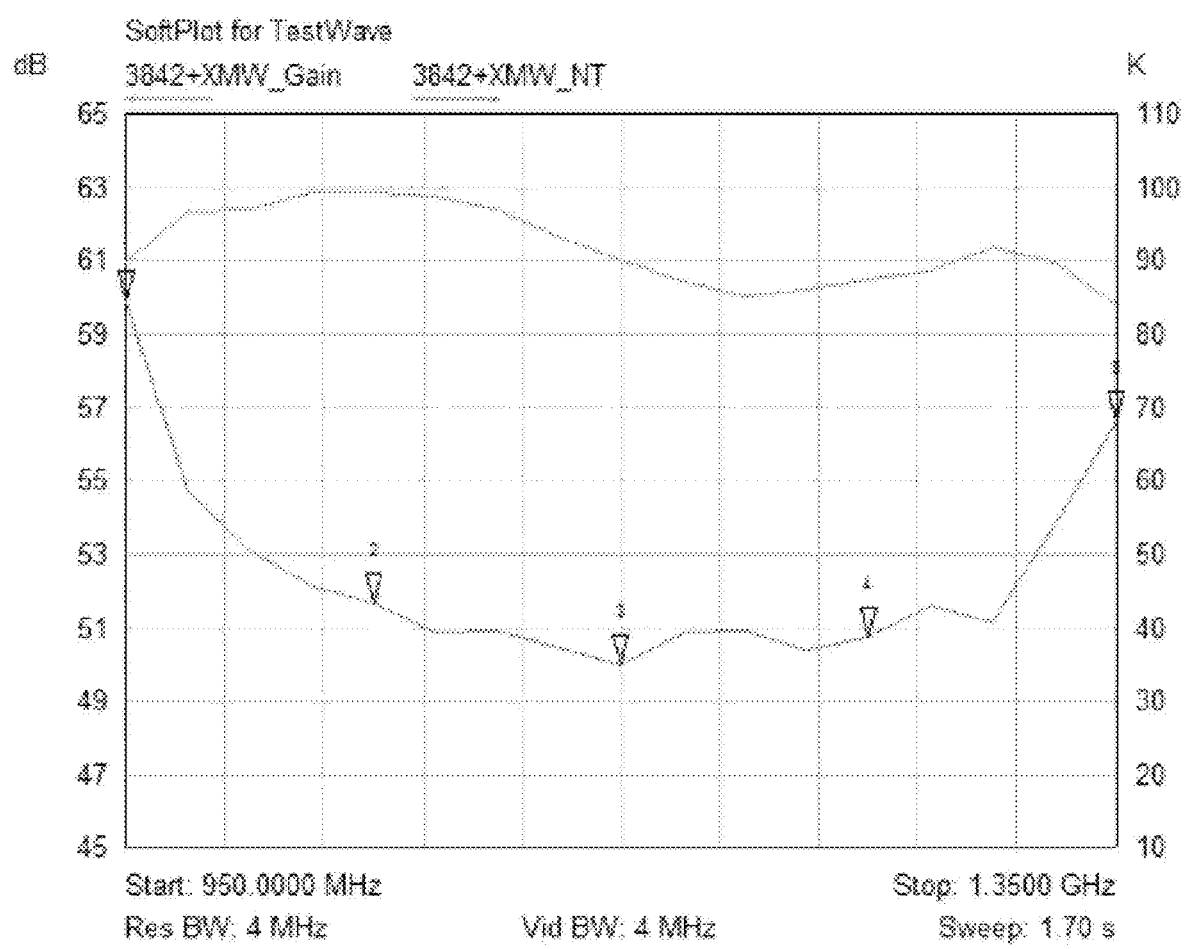
FIG. 12 is a graph illustrating a gain and a noise temperature (NT) of a low noise block down converter for receiving satellite broadcasting, coupled with an external cavity waveguide band pass filter in the related art.

FIG. 11 is a graph illustrating a gain and a noise temperature (NT) of a low noise block down converter for receiving satellite broadcasting according to an embodiment of the disclosure, and FIG. 12 is a graph illustrating a gain and a noise temperature (NT) of a low noise block down converter for receiving satellite broadcasting, coupled with an external cavity waveguide band pass filter in the related art.

Figure 13:
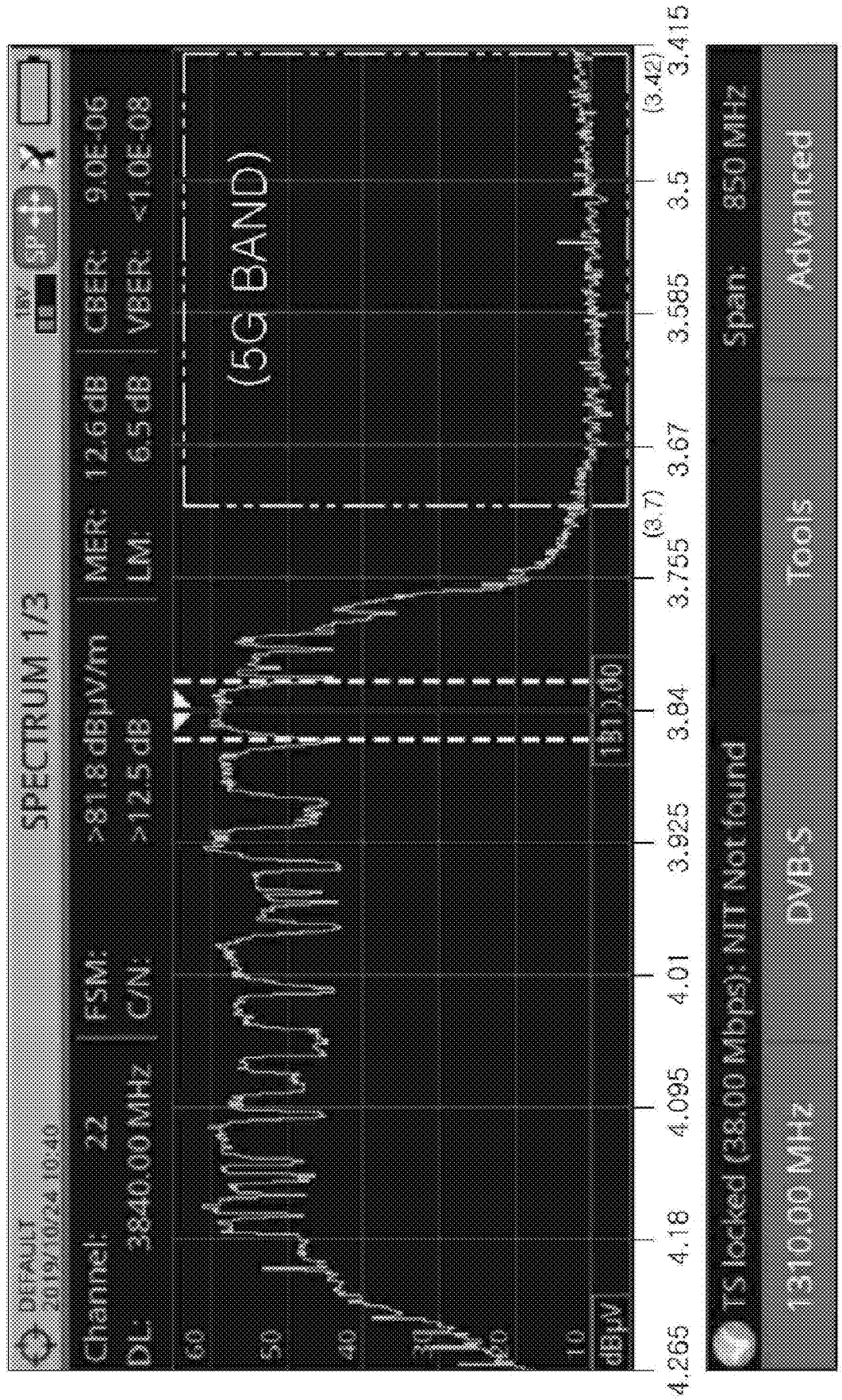
FIG. 13 is a photograph showing frequency spectrums for grasping a signal quality of a low noise block down converter for receiving satellite broadcasting according to an embodiment of the disclosure.
Figure 14:
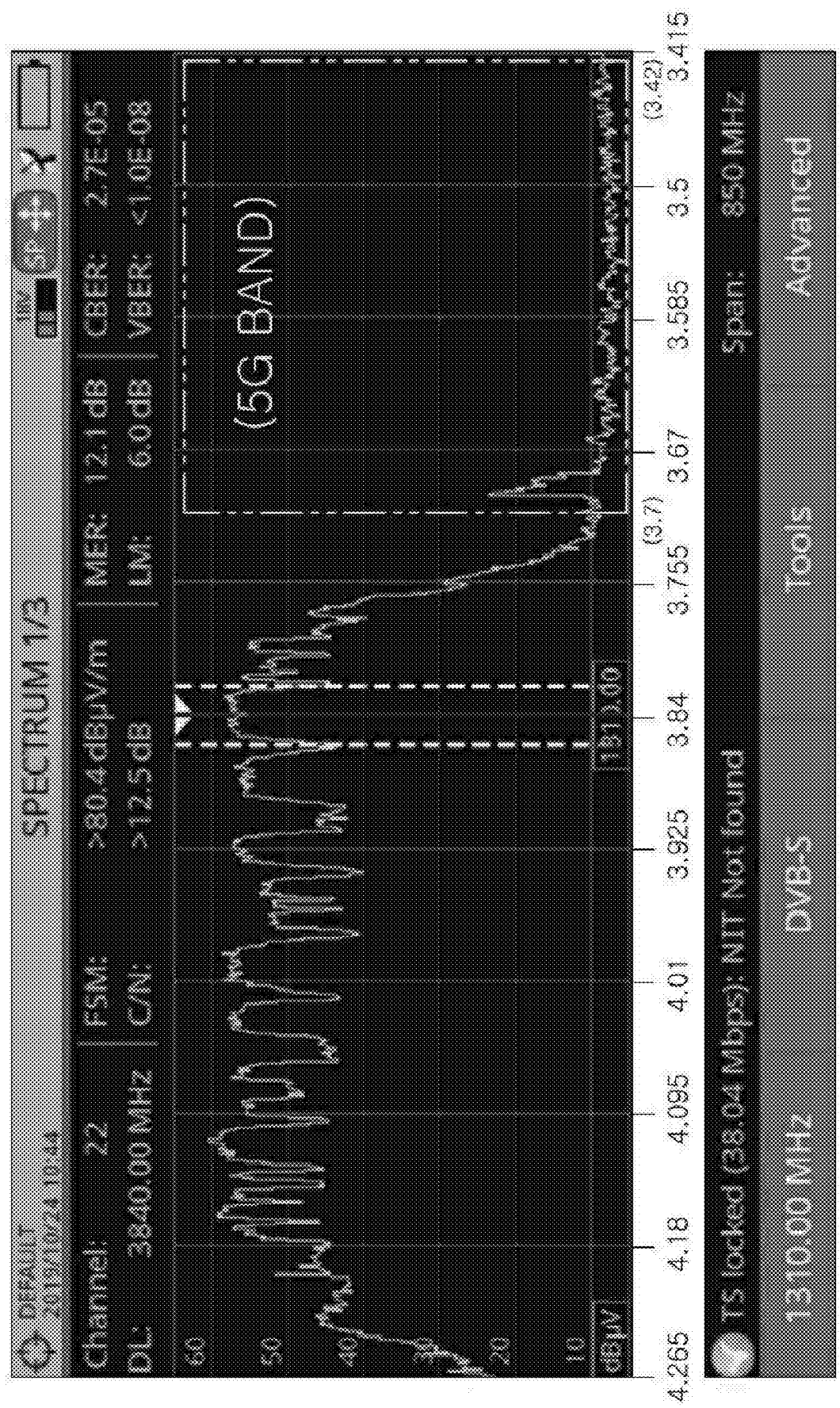
FIG. 14 is a photograph showing frequency spectrums for grasping a signal quality of a low noise block down converter for receiving satellite broadcasting, coupled with an external cavity waveguide band pass filter in the related art.

FIG. 13 is a photograph showing frequency spectrums for grasping a signal quality of a low noise block down converter for receiving satellite broadcasting according to an embodiment of the disclosure, and FIG. 14 is a photograph showing frequency spectrums for grasping a signal quality of a low noise block down converter for receiving satellite broadcasting, coupled with an external cavity waveguide band pass filter in the related art. In case of FIGS. 13 and 14, frequency spectrums of an intermediate frequency signal (885 to 1735 MHz) originally output from a low noise block down converter for receiving satellite broadcasting are illustrated, but to help convenience of understanding, a frequency (3.415 to 4.265 GHz) before being converted into an intermediate frequency signal is indicated on the horizontal axis.

With reference to FIG. 4, an antenna apparatus 300 according to an embodiment of the disclosure includes a reflector 310, a feed horn 330, and a low noise block down converter 400 for receiving satellite broadcasting.

The reflector 310 is a constituent element concentrating radio waves through reflection, and may be formed in a dish shape.

The feed horn 330 is a constituent element receiving the radio waves concentrated by the reflector 310, and for example, as illustrated in FIG. 4, the feed horn 330 may be supported to be fixed to the other end of a support 320 having one end fixed to the reflector 310.

The low noise block down converter 400 for receiving satellite broadcasting is a constituent element converting a signal transferred from the feed horn 330 into an intermediate frequency signal, and includes an input terminal 410, a low noise amplifying unit 420, a local oscillation circuit unit 440, a mixer 450, an intermediate frequency amplifying unit 460, an output terminal 470, a circuit board 401, and a housing 490.

The input terminal 410 is a constituent element transferring the signal received from the feed horn 330 to the low noise amplifying unit 420, and may be formed on the circuit board 401. Further, the input terminal 410 is exposed to a space in a tube portion 493 through penetrating a hole 494h1 formed in a part fixing unit 492 of the housing 490 illustrated in FIG. 8, and is electrically connected to a probe (not illustrated) for detecting the signal from the feed horn 330.

The low noise amplifying unit 420 is a constituent element low-noise-amplifying the signal received from the input terminal 410 and passing a frequency band that is higher or lower than the frequency band of a predetermined terrestrial transmission signal among satellite broadcasting frequency bands of the amplified signal, and includes one or more low noise amplifiers 421 and a built-in cavity waveguide band pass filter 430. In the description, the "terrestrial transmission signal" means a "signal being transmitted from a terrestrial base station or a terminal".

The low noise amplifier 421 is a constituent element low-noise-amplifying the signal received from the input terminal 410, and for example, may be implemented by a transistor. That is, as compared with a general amplifier, the low noise amplifier 421 has a very low noise being generated from the amplifier itself. Further, the low noise amplifier 421 may be composed of, for example, as illustrated in FIG. 5, two low noise amplifiers 421a and 421b including a first low noise amplifier 421a and a second low noise amplifier 421b connected in series with each other, and may be composed of one or three or more low noise amplifiers.

The built-in cavity waveguide band pass filter 430 is a constituent element passing the frequency band that is higher or lower than the frequency band of the predetermined terrestrial transmission signal among the satellite broadcasting frequency bands of the signals amplified by the one or more low noise amplifiers 421, and for example, the satellite broadcasting frequency band may be a C-band satellite broadcasting frequency band (3.4 to 4.2 GHz), and the frequency band of the predetermined terrestrial transmission signal may be the frequency band (3.42 to 3.7 GHz) of the 5G mobile communication signal. Accordingly, the frequency band being passed by the built-in cavity waveguide band pass filter 430 may be the frequency band of 3.8 to 4.2 GHz that is higher than the frequency band (3.42 to 3.7 GHz) of the 5G mobile communication signal among the C-band satellite broadcasting frequency band (3.4 to 4.2 GHz).

In the description, the "cavity waveguide band pass filter" means a "band pass filter having one or more cavities forming a waveguide", and the "built-in cavity waveguide band pass filter" means a "cavity waveguide band pass filter built in the housing of the low noise block down converter for receiving the satellite broadcasting".

With reference to FIGS. 7A to 7D, the built-in cavity waveguide band pass filter 430 includes a body part 431 and a cover part 436.

The body part 431 is a constituent element having one or more cavities forming a waveguide, and includes a bottom plate 435a, a front wall 435b, a rear wall 435c, a first side wall 435d, a second side wall 435e, a bulkhead 434a, a projection portion 434c, a resonator 433, an input pin 431P1, and an output pin 431P2. The body part 431 may be made of a metal or a conductive material.

The bottom plate 435a supports the front wall 435b, the rear wall 435c, the first side wall 435d, the second side wall 435e, the bulkhead 434a, and the resonator 433. The front wall 435b and the rear wall 435c extend from an upper surface of the bottom plate 435a so that they are disposed in front and in the rear of the body part 431, respectively, and the first side wall 435*d* and the second side wall 435*e* extend from the upper surface of the bottom plate 435*a* so that they are disposed on both sides of the body part 431, respectively.

The bulkhead 434*a* and the projection portion 434*c* form a plurality of cavities 432*a* to 432*j* together with the front wall 435*b*, the rear wall 435*c*, the first side wall 435*d*, and the second side wall 435*e*. For example, as illustrated in FIG. 7B, the plurality of cavities 432*a* to 432*j* may be composed of first to tenth cavities 432*a* to 432*j*, that is, 10 cavities, and may be composed of 2 to 9 cavities or 11 or more cavities. Further, the waveguide formed by connecting the plurality of cavities 432*a* to 432*j* to one another may have a path in a zigzag shape as illustrated in FIG. 7B.

The lower end of the bulkhead 434*a* is supported by the bottom plate 435*a*, and one edge of the bulkhead 434*a* is connected to the first side wall 435*d* or the second side wall 435*e*. Further, as illustrated in FIG. 7B, at the other edge of the bulkhead 434*a*, a pillar 434*b* may be integrally formed with the bulkhead 434*a*. On an inside of the pillar 434*b*, a cover part fixing screw hole 434*h* extending along a length direction of the pillar 434*b* may be formed, and a cover part fixing screw 438*a* for fixing the cover part 436 to the body part 431 may be inserted into the cover part fixing screw hole 434*h*.

The projection portion 434*c* projects from one or more of the front wall 435*b*, the rear wall 435*c*, the first side wall 435*d*, and the second side wall 435*e* toward an inner space of the body part 431 to form edges of the cavities 432*a* to 432*j*.

The resonator 433 is a constituent element formed in each of the plurality of cavities 432*a* to 432*j* to cause resonance, and extends from the upper surface of the bottom plate 435*a* in a pillar shape. Inside the resonator 433, a resonator hole 433*h* extending along a length direction of the resonator 433 may be formed.

The input pin 431P1 is a constituent element inputting the signal received from the low noise amplifier 421 to the built-in cavity waveguide band pass filter 430, and one end of the input pin 431P1 may be connected to a filter input terminal 422 formed on the circuit board 401 illustrated in FIG. 6 and the other end thereof may be connected to the resonator 433 in the first cavity 432*a* most disposed on the side of the input pin 431P1 among the plurality of cavities 432*a* to 432*j*.

The output pin 431P2 is a constituent element outputting the signal from the built-in cavity waveguide band pass filter 430, and one end of the output pin 431P2 may be connected to the resonator 433 in the tenth cavity 432*j* most disposed on the side of the output pin 431P2 among the plurality of cavities 432*a* to 432*j* and the other end thereof may be connected to a filter output terminal 423 formed on the circuit board 401 illustrated in FIG. 6.

Further, as illustrated in FIGS. 7B and 7D, on the body part 431, a plurality of filter fixing screw holes 430*h*2 may be formed, into which filter fixing screws (not illustrated) can be inserted through penetrating the first side wall 435*d*, the second side wall 435*e*, and the bottom plate 435*a*. The above-described filter fixing screw holes 430*h*2 of the body part 431 of the built-in cavity waveguide band pass filter 430 are disposed at locations corresponding to the filter fixing screw holes 494*h*3 of the housing 490 illustrated in FIG. 8 when the built-in cavity waveguide band pass filter 430 is fixed to the bottom plate 494 of the part fixing unit 492 of the housing 490.

The cover part 436 is a constituent element covering the upper portion of the body part 431, and includes a cover part body 436*b* and adjustment screws 437*a*. The cover part 436 may be made of a metal or a conductive material.

On the cover part body 436*b*, cover part fixing screw holes 438*b*, into which cover part fixing screws 438*a* for fixing the cover part 436 to the body part 431 are inserted, may be formed. The cover part fixing screws 438*a* may pass through the cover part fixing screw holes 438*b* of the cover part body 436*b*, and may be inserted into the cover part fixing screw holes 435*h* and 434*h* of the body part 431 as illustrated in FIG. 7B in a screw connection manner. Further, on the cover part body 436*b*, filter fixing screw holes 430*h*1, into which filter fixing screws are inserted, may be formed. Further, on the cover part body 436*b*, a groove 436*a* extending in accordance with the locations, in which a plurality of adjustment screws 437*a* to be described hereinafter are disposed, may be formed. The groove 436*a* may have a shape corresponding to a path in a zigzag shape of a waveguide formed on the body part 431.

The adjustment screw 437*a* is a constituent element adjusting a pass band of the built-in cavity waveguide band pass filter 430, and is inserted into a screw hole (not illustrated) formed on the cover part body 436*b*. That is, it is possible to adjust the pass band of the built-in cavity waveguide band pass filter 430 by changing a distance between the resonator 433 and the adjustment screw 437*a* through rotating of the adjustment screw 437*a*. Further, the adjustment-completed adjustment screw 437*a* may be fixed to the cover part body 436*b* by a nut 437*b*.

The local oscillation circuit unit 440 is a circuit unit generating a signal having a predetermined local oscillation frequency, and includes a phase locked loop (PLL) module 441 and a local oscillation amplifier 442. Further, as illustrated in FIG. 5, the local oscillation circuit unit 440 may further include a local oscillation band pass filter 443.

The PLL module 441 is a module generating the signal having the predetermined local oscillation frequency, and for example, the predetermined local oscillation frequency may be 5.15 GHz. The local oscillation amplifier 442 amplifies the signal generated by the PLL module 441, and the local oscillation band pass filter 443 passes only the signal having the predetermined local oscillation frequency among the signals received from the local oscillation amplifier 442.

The mixer 450 is a constituent element converting the signal output from the low noise amplifying unit 420 into an intermediate frequency signal by mixing the signal output from the low noise amplifying unit 420 with the local oscillation signal. For example, in case that the frequency band of the signal output from the low noise amplifying unit 420 is 3.8 to 4.2 GHz and the frequency of the local oscillation signal is 5.15 GHz, the converted intermediate frequency signal has the frequency band of 950 to 1350 MHz corresponding to a difference between the frequency of the local oscillation signal and the frequency band of the signal output from the low noise amplifying unit 420.

Further, the mixer 450 may be an active mixer having a self-gain and amplifying one or more of the signal output from the low noise amplifying unit 420 and the intermediate frequency signal. As described above, in comparison to a case that the mixer 450 is a passive mixer, the low noise block down converter 400 for receiving the satellite broadcasting in case that the mixer 450 is the active mixer has a sufficient gain of the intermediate frequency signal, can minimize the amplification of an unnecessary frequency band by the low noise block down amplifier 421, and can prevent the low noise block down amplifier 421 from being saturated.

Specifically, in the low noise block down converter 400 for receiving the satellite broadcasting in case that the mixer 450 is the passive mixer, the passive mixer has a gain attenuation of about 7 dB, and thus it is necessary that the low noise amplifier 421 is composed of three or more low noise amplifiers. However, if the number of low noise amplifiers 421 is three or more, the amplification of the unnecessary frequency band is excessively performed, and thus the possibility of saturation of the low noise amplifiers 421 becomes high. In contrast, in the low noise block down converter 400 for receiving the satellite broadcasting in case that the mixer 450 is the active mixer, the active mixer has the self-gain of about 3 dB, and thus it is possible to reduce the number of low noise amplifiers 421 to two or less. Accordingly, the amplification of the unnecessary frequency band can be minimized, and the low noise amplifiers 421 can be prevented from being saturated.

As illustrated in FIG. 6, the mixer 450 may be connected to a variable resistor 451 by a conductive pattern 451a formed on the circuit board 401, and may be connected to a thermistor 452 by a conductive pattern 452a. Such a variable resistor 451 or thermistor 452 finely controls the slope and flatness of the conversion gain, and suppresses the gain change against the temperature change.

The intermediate frequency amplifying unit 460 is a constituent element amplifying the signal output from the mixer 450, and includes intermediate frequency amplifiers 461 and 463 and a low pass filter 462. For example, the intermediate frequency amplifiers 461 and 463 may include a first intermediate frequency amplifier 461 and a second intermediate frequency amplifier 463.

The first intermediate frequency amplifier 461 amplifies the signal output from the mixer 450, and the low pass filter 462 is a low pass filter removing a frequency band corresponding to the frequency band of a predetermined terrestrial transmission signal among signals output from the first intermediate frequency amplifier 451. For example, the low pass filter 462 may pass only the frequency band that is equal to or lower than 1350 MHz to remove the frequency band of 1450 to 1730 MHz corresponding to the frequency band (3.42 to 3.7 GHz) of the 5G mobile communication signal. Further, as illustrated in FIG. 6, the low pass filter 462 may include a capacitor C and an inductor L formed in a conductive pattern. The second intermediate frequency amplifier 463 amplifies the signal output from the low pass filter 462, and transfers the amplified signal to the output terminal 470.

Further, between the mixer 450 and the intermediate frequency amplifying unit 460, as illustrated in FIGS. 5 and 6, a low pass filter 480 removing the local oscillation signal among the signals output from the mixer 450 may be connected.

The output terminal 470 is a constituent element transferring the signal received from the intermediate frequency amplifying unit 460 to an external constituent element of the low noise block down converter 400 for receiving the satellite broadcasting, and may be formed on the circuit board 401. Further, the output terminal 470 may be connected to a connector 496 of the part fixing unit 492 of the housing 490 illustrated in FIG. 8.

The circuit board 401 is a board having a mounting surface 401a on which the low noise amplifier 421, the local oscillation circuit unit 440, the mixer 450, and the intermediate frequency amplifier 460 are mounted, and is mounted on the bottom plate 494 of the part fixing unit 492 of the housing. Further, the circuit board 401 has a concave part 51 providing a space in which the built-in cavity waveguide band pass filter 430 is directly fixed to the housing 490.

The housing 490 is a constituent element protecting the circuit board 401 and the built-in cavity waveguide band pass filter 430 being mounted thereon, and includes a main body 491 and a cover 497.

The main body 491 includes a part fixing unit 492, a tube portion 493, and a feed horn coupling unit 498.

The part fixing unit 492 includes a bottom plate 494 and a plurality of side walls 495 so that the part fixing unit 492 has an inner space S2 in which the circuit board 401 and the built-in cavity waveguide band pass filter 430 are disposed. Onto the upper surface of the bottom plate 494, the circuit board 401 and the built-in cavity waveguide band pass filter 430 are fixed. Further, the bottom plate 494 may have a groove 494h2 into which a part of the built-in cavity waveguide band pass filter 430 can be inserted.

The tube portion 493 is a tube having an inner space through which the signal from the feed horn 330 can be transferred, and has one end connected to the part fixing unit 492 and the other end connected to the feed horn coupling unit 498. The feed horn coupling unit 498 is a portion coupling the housing 490 to the feed horn 330, and a screw hole 498a, into which a screw (not illustrated) for being coupled to the feed horn 330 can be inserted, may be formed on the feed horn coupling unit 498.

The cover 497 is a constituent element covering the upper portion of the part fixing unit 492 of the main body 491, and may be in a plate shape.

The low noise block down converter 400 for receiving the satellite broadcasting according to the embodiment removes the frequency band of the predetermined terrestrial transmission signal through the built-in cavity waveguide band pass filter 430, and thus has merits of high economic efficiency and easy installation work and equipment maintenance as compared with the low noise block down converter 200 for receiving the satellite broadcasting, coupled with the external cavity waveguide band pass filter 140 in the related art.

Further, according to the low noise block down converter 400 for receiving the satellite broadcasting according to the embodiment, the built-in cavity waveguide band pass filter 430 removing the frequency band of the predetermined terrestrial transmission signal is disposed on the output end side of the low noise amplifier 421, and thus the noise of the built-in cavity waveguide band pass filter 430 itself can be prevented from being amplified by the low noise amplifier 421. In contrast, according to the low noise block down converter 200 for receiving the satellite broadcasting, coupled with the external cavity waveguide band pass filter 140 in the related art, the external cavity waveguide band pass filter 140 is disposed on the input end side of the low noise amplifier, and thus the noise of the external cavity waveguide band pass filter 140 itself is amplified by the low noise amplifier. Accordingly, as compared with the low noise block down converter 200 for receiving the satellite broadcasting, coupled with the external cavity waveguide band pass filter 140 in the related art, the low noise block down converter 400 for receiving the satellite broadcasting according to the disclosure can improve the quality of the received satellite broadcasting signal.

Figure 1:
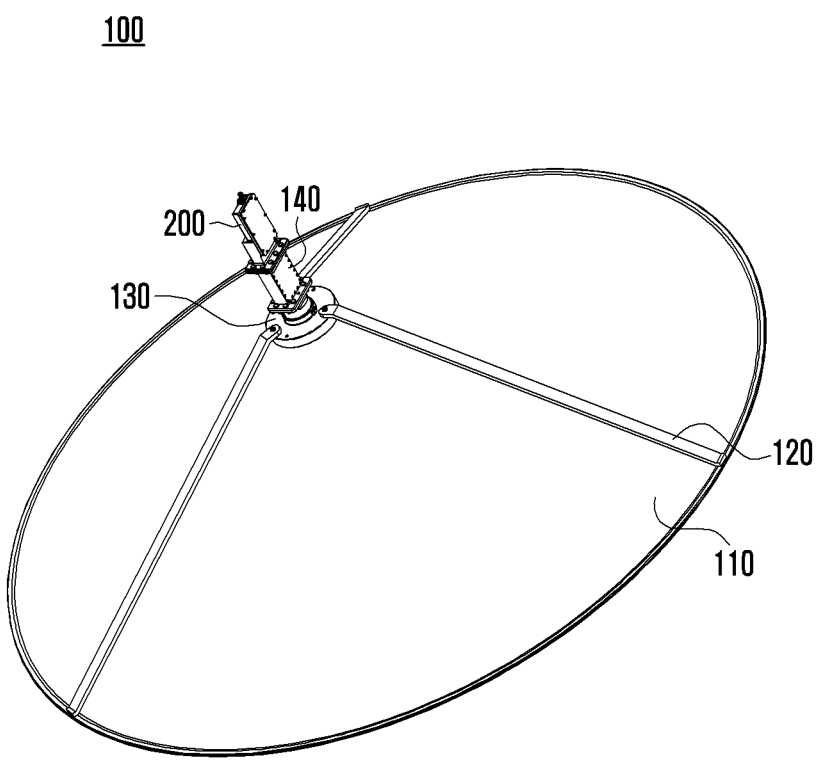
FIG. 1 is a perspective view of an antenna apparatus including a low noise block down converter for receiving satellite broadcasting coupled with an external cavity waveguide band pass filter in the related art.
Figure 2:
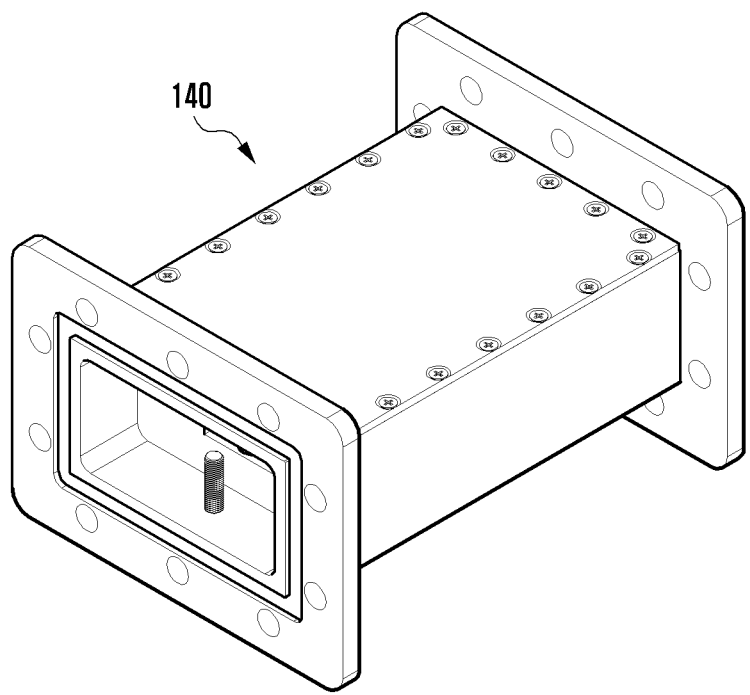
FIG. 2 is a perspective view of an external cavity waveguide band pass filter in the related art.
Figure 3:
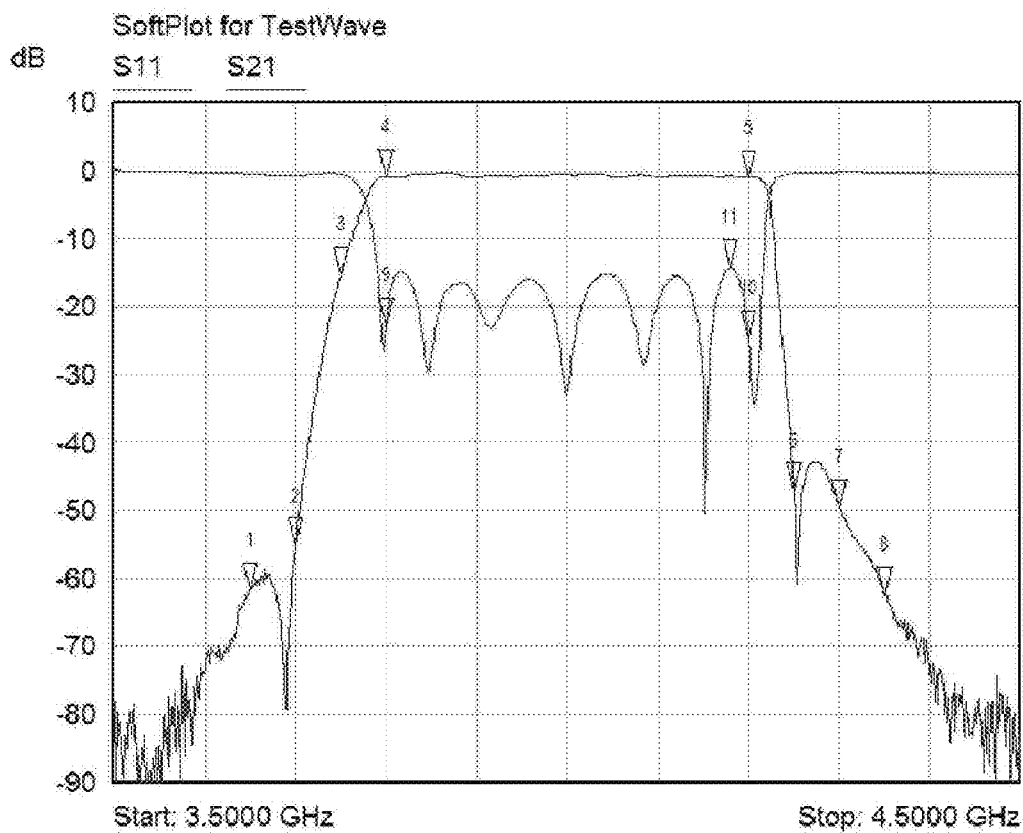
FIG. 3 is a graph illustrating a reflection loss and an insertion loss of an external cavity waveguide band pass filter in the related art.

Specifically, with reference to FIGS. 3 and 9, the built-in cavity waveguide band pass filter 430 according to the embodiment and the external cavity waveguide band pass filter 140 in the related art show insertion losses S21 and S(21) of similar levels in the pass band (3.8 to 4.2 GHz), but as can be seen from FIGS. 11 and 12, as compared with the noise temperature of the low noise block down converter 200 for receiving the satellite broadcasting, coupled with the external cavity waveguide band pass filter 140 in the related art, the noise temperature of the low noise block down converter 400 for receiving the satellite broadcasting according to the disclosure is low throughout the pass band (950 to 1350 MHz) of the converted intermediate frequency signal.

Further, with reference to FIG. 10, the low noise block down converter 400 for receiving the satellite broadcasting according to the embodiment performs removal of the frequency band of 890 MHz or less among the converted intermediate frequency signals, that is, removal of the frequency band of 4.26 GHz or more among the signals before being converted, much better than the low noise block down converter 200 for receiving the satellite broadcasting, coupled with the external cavity waveguide band pass filter 140 in the related art.

Further, with reference to FIGS. 13 and 14, the low noise block down converter 400 for receiving the satellite broadcasting according to the embodiment has almost no noise in the frequency band of the 5G mobile communication signal that is the terrestrial transmission signal, whereas the low noise block down converter 200 for receiving the satellite broadcasting, coupled with the external cavity waveguide band pass filter 140 in the related art shows a considerably big noise of about 25 dBμV in the frequency band of the 5G mobile communication signal.

Next, the low noise block down converter for receiving the satellite broadcasting according to a comparative example in which the band pass filter of the low noise amplifying unit 420 is formed by one or more conductive patterns (not illustrated) on the circuit board 401 will be described. The band pass filter formed by the one or more conductive patterns has a gentle slope of gain attenuation occurring when the patterns are directed from both ends of the pass band to the outside of the pass band. In contrast, the built-in cavity waveguide band pass filter 430 according to the embodiment has a steep slope of gain attenuation occurring when the patterns are directed from both ends of the pass band to the outside of the pass band. Accordingly, as compared with the low noise block down converter for receiving the satellite broadcasting according to the comparative example, the low noise block down converter 400 for receiving the satellite broadcasting according to the embodiment has excellent removal characteristics of the signal excluding the pass band and little noise, and thus can improve the quality of the received satellite broadcasting signal.

Although the disclosure has been illustrated and described according to preferred embodiments of the accompanying exemplified drawings, the disclosure is not limited thereto, and it is apparent that various changes or modifications can be made by those of ordinary skill in the art to which the disclosure pertains within the range of the technical idea of the disclosure described in the following claims.

What is claimed is:

1. A low noise block down converter for receiving satellite broadcasting, comprising:
   an input terminal;
   a low noise amplifying unit including one or more low noise amplifiers configured to amplify a signal received from the input terminal, and a built-in cavity waveguide band pass filter configured to pass a frequency band being higher or lower than a frequency band of a predetermined terrestrial transmission signal among satellite broadcasting frequency bands of signals amplified by the one or more low noise amplifiers, the built-in cavity waveguide band pass filter having an input pin and an output pin;
   a circuit board including a mounting surface on which the one or more low noise amplifiers are mounted, a filter input terminal to which the input pin is connected, and a filter output terminal to which the output pin is connected; and
   a mixer configured to convert signal output from the low noise amplifying unit into an intermediate frequency signal by mixing the signal output from the low noise amplifying unit with a local oscillation signal, the mixer being mounted on the mounting surface.

2. The low noise block down converter of claim 1, wherein the mixer is an active mixer configured to amplify one or more of the signal output from the low noise amplifying unit and the intermediate frequency signal.

3. The low noise block down converter of claim 1, wherein the predetermined terrestrial transmission signal is a 5G mobile communication signal.

4. The low noise block down converter of claim 1, wherein the satellite broadcasting frequency bands include a C-band satellite broadcasting frequency band.

5. The low noise block down converter of claim 1, further comprising an intermediate frequency amplifying unit including an intermediate frequency amplifier configured to amplify a signal output from the mixer, and a low pass filter configured to remove a frequency band corresponding to the frequency band of the predetermined terrestrial transmission signal among signals output from the intermediate frequency amplifier.

6. The low noise block down converter of claim 1, further comprising a local oscillation circuit unit including a PLL module configured to generate a signal including a predetermined local oscillation frequency and a local oscillation amplifier configured to amplify a signal generated by the PLL module, and configured to output the local oscillation signal.

7. The low noise block down converter of claim 1, wherein the circuit board further includes a concave part providing a space in which the built-in cavity waveguide band pass filter is directly fixed to a housing.

8. The low noise block down converter of claim 7, wherein the housing comprises a part fixing unit including a bottom plate to which the circuit board and the built-in cavity waveguide band pass filter are fixed.

9. The low noise block down converter of claim 1, wherein the built-in cavity waveguide band pass filter comprises a body part including one or more cavities forming a waveguide, and a cover part configured to cover an upper portion of the body part.

10. An antenna apparatus comprising:
    a reflector configured to concentrate radio waves through reflection;
    a feed horn configured to receive the radio waves concentrated by the reflector; and
    a low noise block down converter for receiving satellite broadcasting, comprising:
    an input terminal;
    a low noise amplifying unit including one or more low noise amplifiers configured to amplify a signal received from the input terminal, and a built-in cavity waveguide band pass filter configured to pass a frequency band being higher or lower than a frequency band of a predetermined terrestrial transmission signal among satellite broadcasting frequency bands of signals amplified by the one or more low noise amplifiers, the built-in cavity waveguide band pass filter having an input pin and an output pin;

a circuit board including a mounting surface on which the one or more low noise amplifiers are mounted, a filter input terminal to which the input pin is connected, and a filter output terminal to which the output pin is connected; and a mixer configured to convert signal output from the low noise amplifying unit into an intermediate frequency signal by mixing the signal output from the low noise amplifying unit with a local oscillation signal, the mixer being mounted on the mounting surface.

11. The antenna apparatus of claim 10, wherein the mixer is an active mixer configured to amplify one or more of the signal output from the low noise amplifying unit and the intermediate frequency signal.

12. The antenna apparatus of claim 10, wherein the predetermined terrestrial transmission signal is a 5G mobile communication signal.

13. The antenna apparatus of claim 10, wherein the satellite broadcasting frequency bands include a C-band satellite broadcasting frequency band.

14. The antenna apparatus of claim 10, the low noise block down converter further comprising an intermediate frequency amplifying unit including an intermediate frequency amplifier configured to amplify a signal output from the mixer, and a low pass filter configured to remove a frequency band corresponding to the frequency band of the predetermined terrestrial transmission signal among signals output from the intermediate frequency amplifier.

15. The antenna apparatus of claim 10, the low noise block down converter further comprising a local oscillation circuit unit including a PLL module configured to generate a signal including a predetermined local oscillation frequency and a local oscillation amplifier configured to amplify a signal generated by the PLL module, and configured to output the local oscillation signal.

16. The antenna apparatus of claim 10, wherein the circuit board further includes a concave part providing a space in which the built-in cavity waveguide band pass filter is directly fixed to a housing.

17. The antenna apparatus of claim 16, wherein the housing comprises a part fixing unit including a bottom plate to which the circuit board and the built-in cavity waveguide band pass filter are fixed.

18. The antenna apparatus of claim 10, wherein the built-in cavity waveguide band pass filter comprises a body part including one or more cavities forming a waveguide, and a cover part configured to cover an upper portion of the body part.

* * * * *